United States Patent
Cho

(10) Patent No.: US 6,205,175 B1
(45) Date of Patent: Mar. 20, 2001

(54) METHOD AND APPARATUS FOR ENCODING A CONTOUR OF AN OBJECT IN A VIDEO SIGNAL BY EMPLOYING A VERTEX CODING TECHNIQUE

(75) Inventor: Sung-Ryul Cho, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/213,173

(22) Filed: Dec. 17, 1998

(30) Foreign Application Priority Data

Dec. 20, 1997 (KR) .................................................. 97-71304

(51) Int. Cl.[7] .............................. H04N 7/12; H04N 7/26
(52) U.S. Cl. ...................... 375/240.08; 382/234; 348/441
(58) Field of Search ........................ 375/240.08, 240.09; 382/232, 234, 242, 241, 243; 348/441, 384; H04N 7/12, 7/26

(56) References Cited

U.S. PATENT DOCUMENTS

| 4,651,211 | * | 3/1987 | Weckenbrock et al. | 348/699 |
| 4,837,618 | * | 6/1989 | Hatori et al. | 348/401.1 |
| 5,142,362 | * | 8/1992 | Masera et al. | 375/240.01 |
| 5,418,569 | * | 5/1995 | Ando | 375/240.12 |
| 5,497,203 | * | 3/1996 | Kayashima et al. | 348/699 |
| 5,515,114 | * | 5/1996 | Murata | 348/420.1 |

FOREIGN PATENT DOCUMENTS

| 0853435 | 7/1998 | (EP) . |
| 0854651 | 7/1998 | (EP) . |

OTHER PUBLICATIONS

K J O'Connel, "Object–Adaptive Vertex–Based Shape Coding Method" IEEE Transactions on Circuits and Systems for Video Technology, Feb. 1997, vol. 7, No. 1, pp. 251–255.

* cited by examiner

Primary Examiner—Howard Britton
Assistant Examiner—Nhon T. Diep
(74) Attorney, Agent, or Firm—Pennie & Edmonds LLP

(57) ABSTRACT

In a method for encoding a contour of an object in a video signal based on a vertex information representing a position and an index of an octant corresponding to each vertex of the contour, a maximum length line segment (MLLS) is first detected among line segments for the contour based on the vertex information (VI). Then, an initial vertex position information (IVPI) and a final vertex position information (FVPI) for the contour are encoded, the initial vertex and the final vertex being two vertices constituting the MLLS. Thereafter, a first bit number (FBN) and a second bit number (SBN) for the contour are set, wherein the FBN is the number of bits required to encode the MLLS and the SBN is the number of bits calculated by using the FBN, typically being FBN-1. In a subsequent step, each of the vertices are classified based on the SBN and the VI either as a first vertex (FV) or as a second vertex (SV) to thereby provide first vertices (FV's) and second vertices (SV's). Then, an escape signal (ECS) for each SV is produced to supply a plurality of ECS's for the SV's. The numbers of the FV's (NFV) and the SV's (NSV) for the contour are calculated, respectively. Thereafter, each of the FV's and the SV's is encoded with either the FBN or the SBN based on the ECS's and the comparison result for the NFV and the NSV to thereby provide encoded FV's and encoded SV's.

16 Claims, 6 Drawing Sheets

METHOD AND APPARATUS FOR ENCODING A CONTOUR OF AN OBJECT IN A VIDEO SIGNAL BY EMPLOYING A VERTEX CODING TECHNIQUE

FIELD OF THE INVENTION

The present invention relates to a method and apparatus for encoding a contour of an object in a video signal; and, more particularly, to a method and apparatus for encoding a contour of an object in a video signal by employing a vertex coding technique.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially in the case of such low bit-rate video signal encoders as video-telephone and teleconference systems.

One of such techniques for encoding video signals for a low bit-rate encoding system is the so-called object-oriented analysis-synthesis coding technique, wherein an input video image is divided into objects, and three sets of parameters for defining the motion, contour and pixel data of each object are processed through different encoding channels.

In processing a contour of an object expressed in a video signal, contour information representing positions of contour pixels constituting the contour is important for the analysis and synthesis of the shape of the object. A classical coding method used to represent the contour information is a chain coding technique. The chain coding technique, however, requires a substantial amount of bits for representing the contour information, although the technique does not incur any loss in the contour information.

To overcome the drawback of the chain coding method, therefore, there have been proposed several methods to encode the contour information such as a polygonal approximation, B-spline approximation and DST (Discrete Sine Transform) combined with a polygonal approximation technique. In such approximation techniques, the contour is approximated by line or curve segments, each of the segments connecting a pair of neighboring vertices on the contour, and the vertices are encoded based on, e.g., the so-called locally-adaptive octant-based vertex coding technique (see, e.g., International Organization for Standardization, Coding of Moving Pictures and Audio Information, ISO/IEC JTCI/SC29/WG11, Shape Coding AHG, Jul. 30, 1996, entitled "Revised Description of S4a: Geometrical Representation Method"by K. O'Connell, P. Gerken and J. H. Kim).

Referring to FIG. 1, there is shown a schematic block diagram of a conventional apparatus for encoding vertices of a contour of an object in a video signal based on the octant-based vertex coding technique.

A binary mask is inputted to a contour extraction block 10, wherein each of the pixels in the binary mask is represented by one of the binary values depending on whether said each pixel resides either in an object or in a background region. For example, the binary values are 0 and 255, respectively.

The contour extraction block 10 extracts a contour image of the object by using the binary mask and provides the contour image to a vertex selection block 20. The contour is made of contour pixels, each being an object pixel positioned on the boundary of the object.

The vertex selection block 20 selects a plurality of vertices by using a conventional iterative refinement technique, e.g., a polygonal approximation technique, wherein a pair of contour pixels separated by a maximum distance are determined first as a starting vertex and additional contour pixels are selected, one by one, as another vertex until a largest perpendicular distance $d_{max}$ from a line segment joining a pair of adjacent vertices to a contour segment defined by the pair of adjacent vertices does not exceed a preset threshold $D_{max}$.

At a vertex coding block 30, the vertices received from the vertex selection block 20 are encoded based on, e.g., the so-called octant-based vertex coding technique.

In the octant-based vertex coding technique, an x and a y component, denoted as X and Y, of a displacement R between every pair of adjacent vertices are calculated. Thereafter, two vertices corresponding to a largest magnitude among all the x and the y components (X's and Y's) are selected as an initial vertex and a final vertex of the contour. N vertices are then sequentially indexed along the contour starting from the initial vertex toward the final vertex as shown in FIG. 2, N being a total number of vertices on the contour and assumed to be 8 in FIG. 2 for the purpose of illustration. In FIG. 2, the x component corresponding to the pair of vertices $V_1$ and $V_8$ is shown to be the largest among the 8 pairs of X's and Y's obtained from the vertices $V_1$ to $V_8$.

After determining the initial and the final vertices, an x_max and a y_max, the respective maximum values among the x and the y components ($X_i$'s and $Y_i$'s) of the displacements $R_i$'s, are determined as an x_dynamic_range and a y_dynamic_range of the contour, respectively, wherein $R_i=P_{i+1}-P_i$ for i=1,2, . . . ,N−1, $P_i$ being a position vector corresponding to a vertex $V_i$. Subsequently, the total number of vertices N, the x_dynamic_range, the y_dynamic_range and an absolute position of the initial vertex $V_1$ are encoded, while each of the remaining vertices, i.e., $V_{i+1}$ for i=1 to (N−1), is encoded based on the displacement $R_i$ from its previous vertex $V_i$.

Specifically, as shown in FIG. 3, an octant to which a vertex $V_{i+1}$ belongs is determined among octant 0 to octant 7 based on an x component $X_i$ and a y component $Y_i$ of the displacement $R_i$, wherein the eight nearest neighbors to the origin (all marked by the closed circles in FIG. 3) represent the starting points of the eight octants.

After determining octants for the vertices $V_{i+1}$'s, the indices of the octants are coded by using the conventional differential chain coding technique; and the magnitudes of the components $X_i$ and $Y_i$, i.e., x_mag and y_mag, representing the relative position of the vertex $V_{i+1}$ with respect to its preceding vertex $V_i$ are encoded using the bits determined based on the x_dynamic_range and the y_dynamic_range, respectively.

In another instance of the octant-based vertex coding technique, the octant indices and $R_i$'s are encoded alternatively through the use of the so-called syntax-adaptive arithmetic coding (SAAC). In the SAAC, the number of possible symbols depends on the dynamic range maximum, i.e., max(x_dynamic_range, y_dynamic_range). For further details of the octant-based vertex coding technique, see K. O'Connell et al., supra.

By virtue of the process of ordering the vertices as described above, the amount of data representing the vertices can be effectively reduced in the octant-based vertex coding technique, since each of the vertices except the initial one is represented by the octant it belongs to and the magnitudes of $X_i$ and $Y_i$.

Meanwhile, in the conventional vertex coding method, the number of bits needed to encode the magnitudes depends directly on the x_dynamic_range and the y_dynamic_range. In other words, the number of bits needed to encode a magnitude of a line segment depends on a maximum magnitude thereof obtained based on the x_dynamic_range and the y_dynamic_range.

Specifically, in the conventional vertex coding method, the number of bits needed to encode a line segment having a largest length among line segments approximating a contour is determined as a threshold (TH) for use in encoding each line segment thereof. Then, each of the line segments thereof is encoded with the TH number of bits.

Since such conventional vertex coding method still requires a large amount of bits in representing or encoding the vertices, a further reduction of the large amount of bits is desirable, especially when almost all of line segments are considerably shorter than the line segment having a largest length thereof among them.

SUMMARY OF THE INVENTION

It is, therefore, a primary object of the invention to provide a method and apparatus for encoding a contour of an object in a video signal by using a vertex coding technique employing adaptive encoding-bit numbers, thereby enhancing the encoding efficiency thereof.

In accordance with one aspect of the present the invention, there is provided a method for encoding a contour of an object in a video signal based on a vertex information representing a position and an index of an octant corresponding to each vertex of the contour by using an octant-based vertex coding technique, wherein a plurality of vertices are determined on the contour and each of contour segments defined by two adjacent vertices is approximated by corresponding one of line segments joining the two adjacent vertices, the method comprising the steps of: (a) detecting a maximum length line segment (MLLS) among the line segments for the contour based on the vertex information; (b) encoding an initial vertex position information (IVPI) and a final vertex position information (FVPI) for the contour, wherein the initial vertex and the final vertex are two vertices constituting the MLLS; (c) setting a first bit number (FBN) and a second bit number (SBN) for the contour, wherein the FBN is the number of bits required to encode the MLLS and the SBN is the number of bits calculated by using the FBN in accordance with a preset calculation rule, the SBN being smaller than the FBN; (d) classifying, based on the SBN and the vertex information, each of the vertices either as a first vertex or as a second vertex in accordance with a preset classification rule to thereby provide first vertices (FV's) and second vertices (SV's); (e) producing an escape signal (ECS) for each second vertex to thereby supply a plurality of ECS's for the SV's; and (f) calculating the number of the FV's (NFV) and the number of the SV's (NSV) for the contour.

Further, in accordance with another aspect of the present the invention, there is provided an apparatus for encoding a contour of an object in a video signal based on a vertex information representing a position and an index of an octant corresponding to each vertex of the contour by using an octant-based vertex coding technique, wherein a plurality of vertices are determined on the contour and each of contour segments defined by two adjacent vertices is approximated by corresponding one of line segments joining the two adjacent vertices, the apparatus comprising: a maximum length line segment (MLLS) detection & encoding-bit setting circuit, based on the vertex information, for detecting a MLLS among the line segments for the contour and then setting a first bit number (FBN) and a second bit number (SBN) for the contour and at the same time providing an initial vertex position information (IVPI) and a final vertex position information (FVPI), wherein the initial vertex and the final vertex are two vertices constituting the MLLS, respectively, the FBN is the number of bits required to encode the MLLS, the SBN is the number of bits calculated by using the FBN in accordance with a preset calculation rule, and the SBN is smaller than the FBN; a vertex classification circuit, based on the SBN and the vertex information, for classifying each of the vertices either as a first vertex or as a second vertex in accordance with a preset classification rule to thereby provide first vertices (FV's) and second vertices (SV's); a circuit for calculating the number of FV'S (NFV) for the contour; a circuit for calculating the number of the SV's (NSV) for the contour and producing an escape signal (ECS) for each second vertex to thereby supply the NSV and a plurality of ECS's for the SV's; and a comparator for comparing (NFV/NSV) with a predetermined threshold value TH, thereby supplying the FV's and the SV's if (NFV/NSV)>TH, and supplying the FV's, the SV's and the ECS's and at the same time generating an indication signal for the contour if (NFV/NSV)≦TH.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
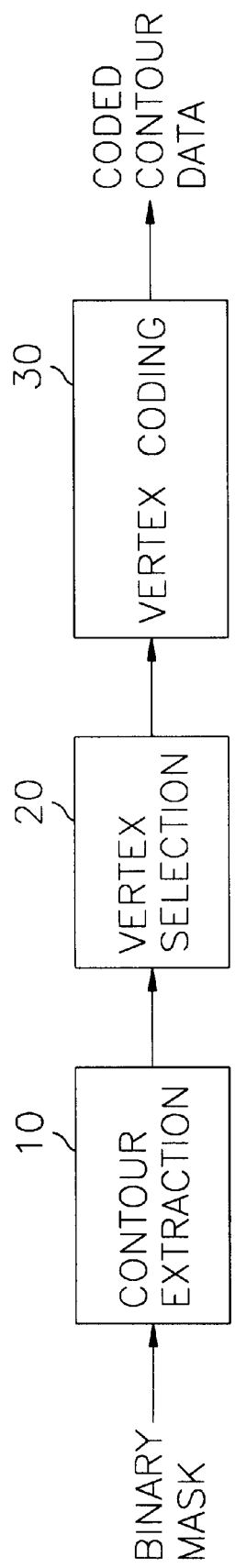
FIG. 1 shows a schematic block diagram of a conventional apparatus for encoding vertices of a contour of an object in a video signal based on the octant-based vertex coding technique.
Figure 2:
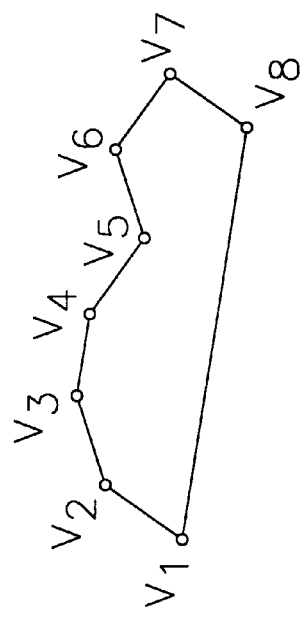
FIG. 2 presents an exemplary contour for illustrating an initial vertex selection process of a conventional apparatus for encoding vertices of a contour.
Figure 3:
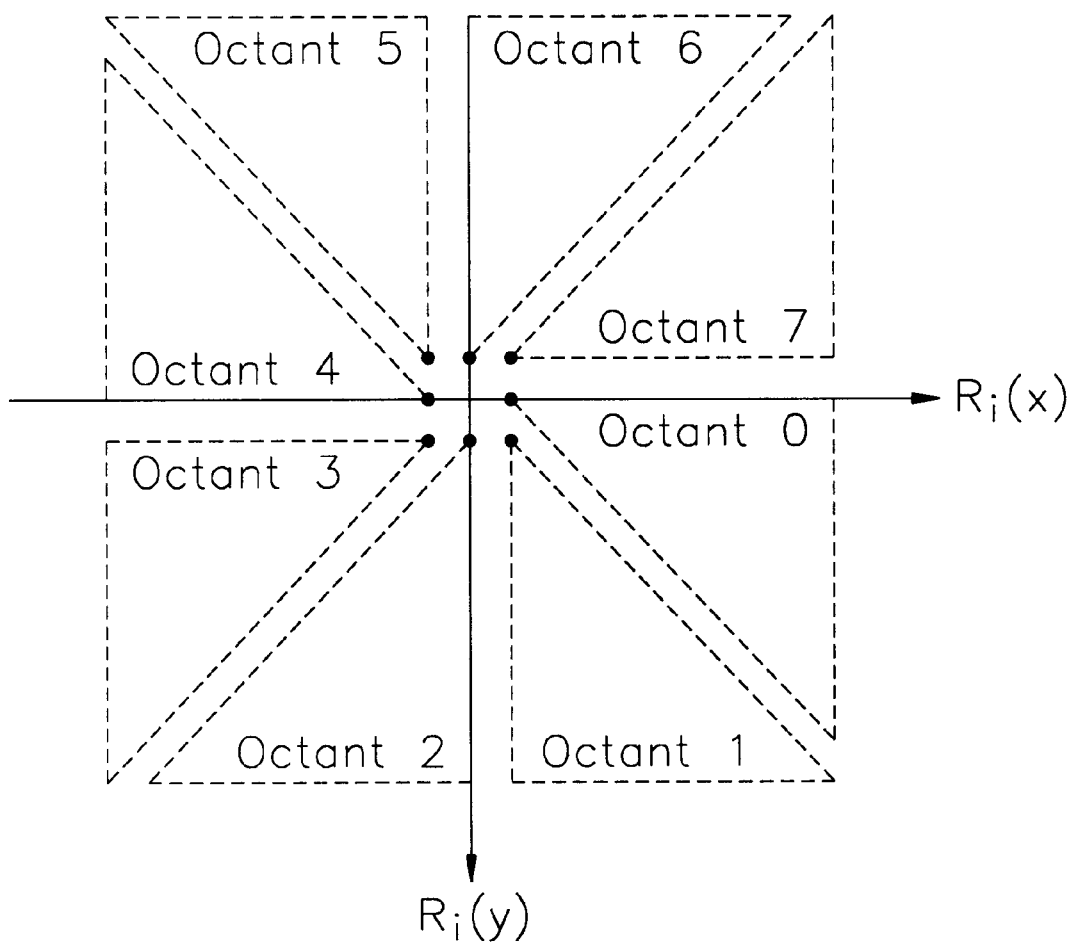
FIG. 3 describes an explanatory diagram for illustrating the relative address octant areas.
Figure 4A:
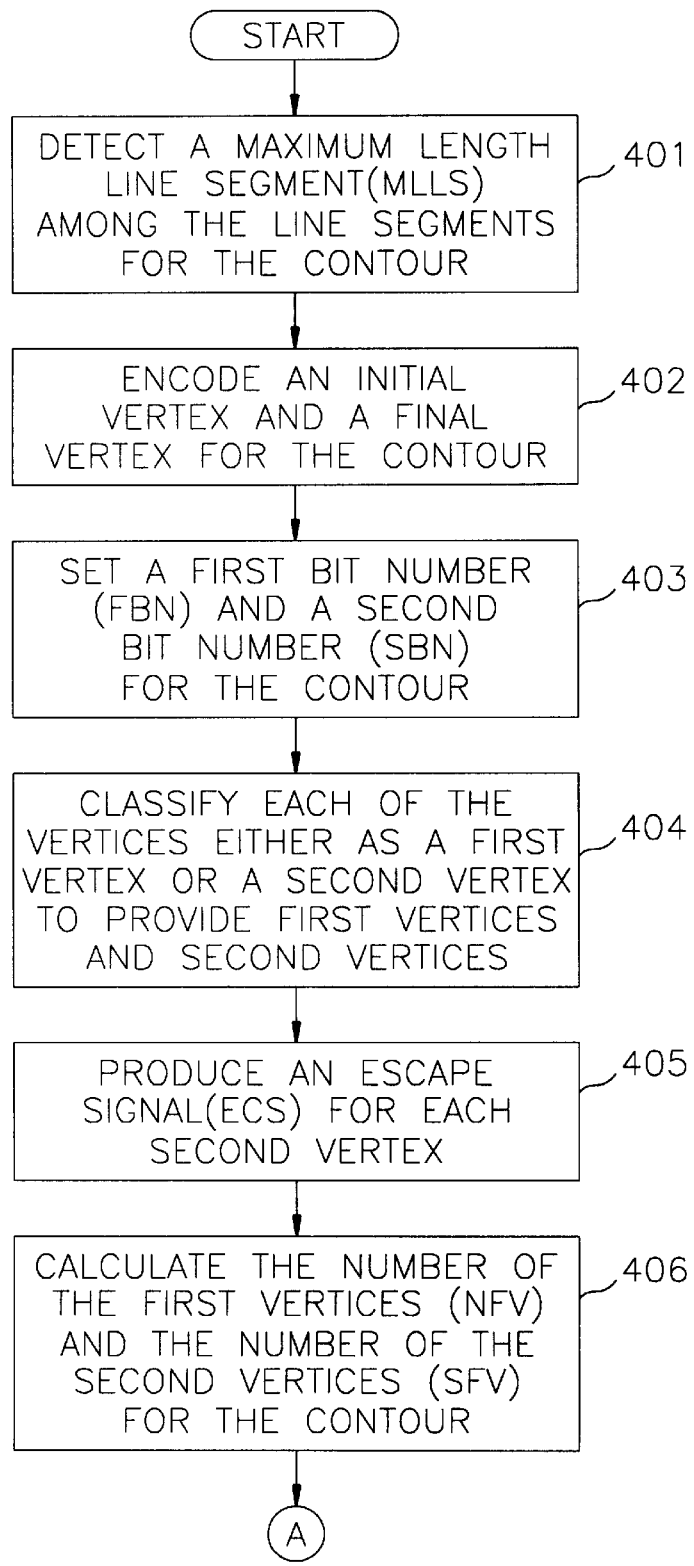
FIGS. 4A and 4B represent a flow chart for illustrating a method for encoding a contour of an object in a video signal in accordance with a preferred embodiment of the present invention.
Figure 4B:
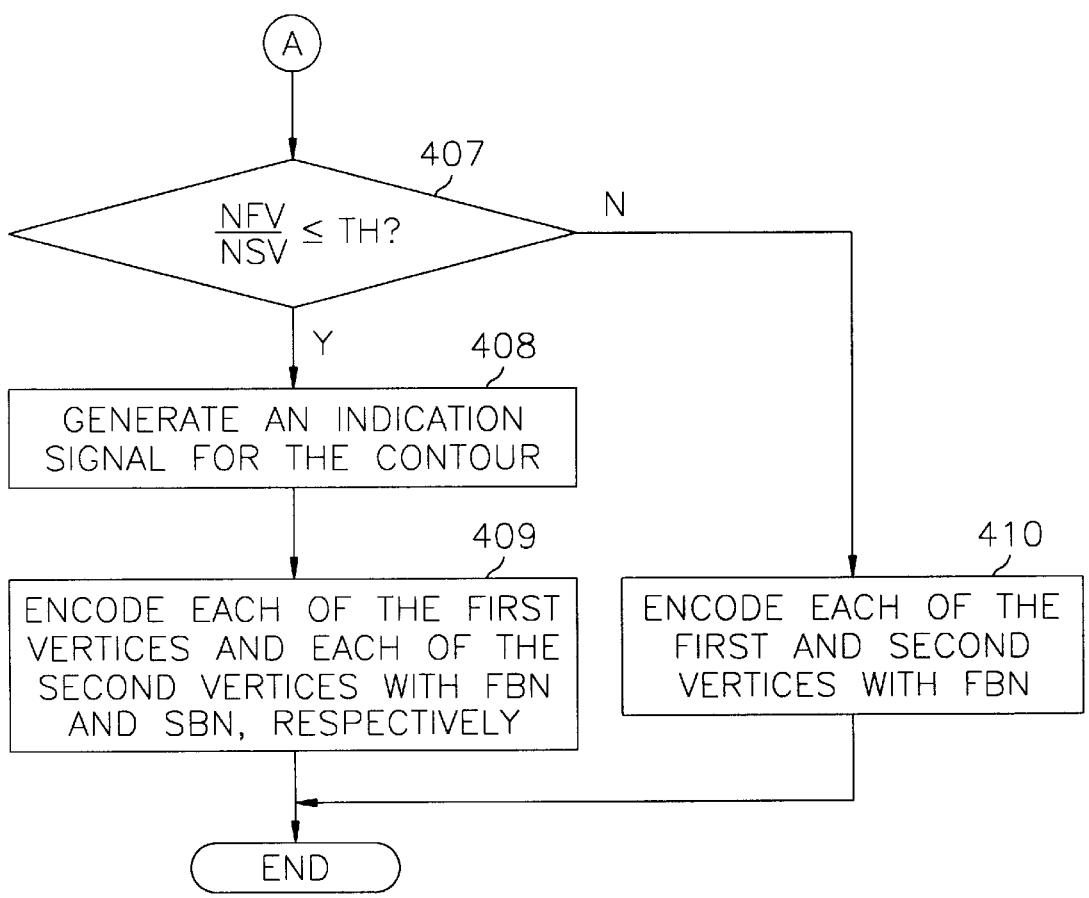
Figure 6:
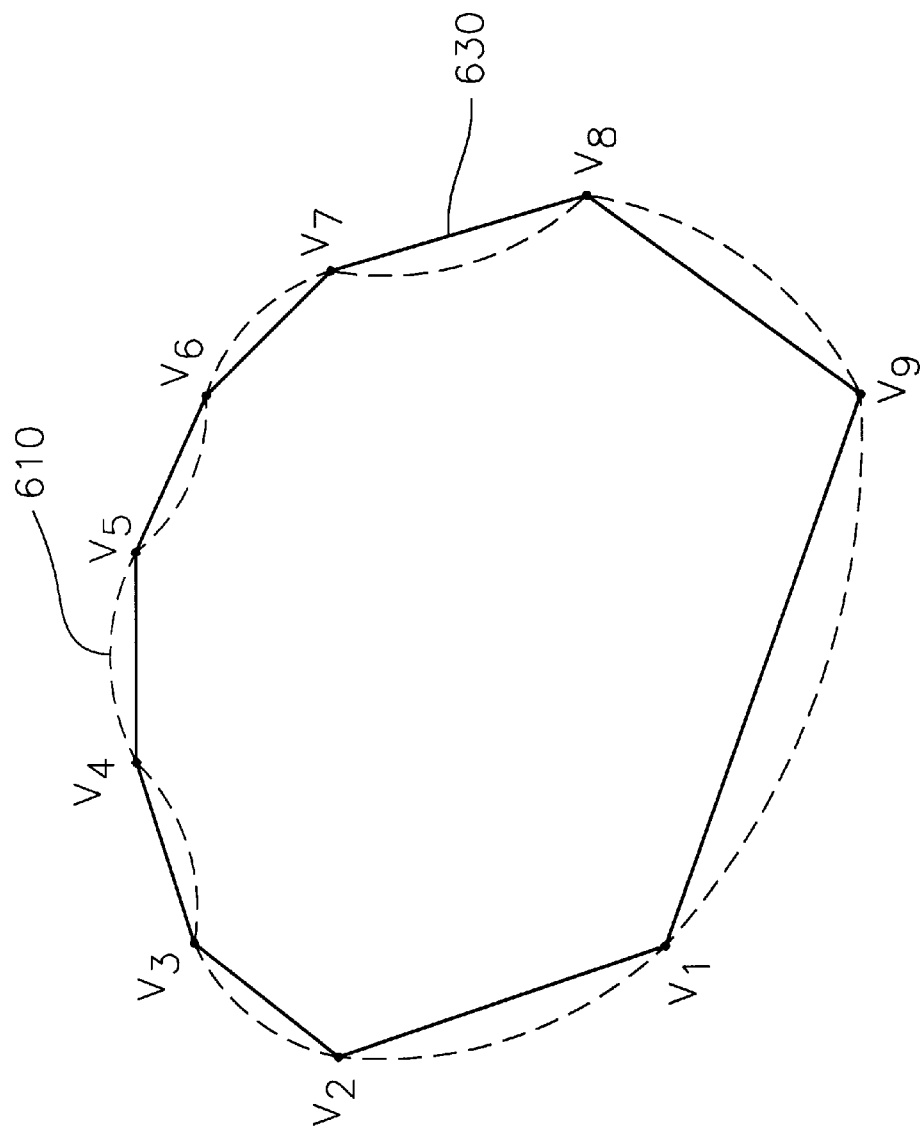
FIG. 6 depicts a diagram for showing a contour and a polygon having vertices thereon approximating the contour.

Referring to FIGS. 4A and 4B, there is represented a flow chart for illustrating a method or process for encoding a contour of an object in a video signal in accordance with a preferred embodiment of the present invention. FIG. 6 depicts a diagram for showing a contour 610 and a polygon 630 having vertices $V_1$ to $V_9$ thereon approximating the contour 610. From now on, a process for encoding a contour of an object in accordance with a preferred embodiment of the present invention will be described in detail with reference to FIGS. 4A–4B and FIG. 6.

In the process, the contour of the object in the video signal is encoded based on a vertex information representing a position and an index of an octant corresponding to each vertex of the contour by using an octant-based vertex coding technique, wherein a plurality of vertices are determined on the contour and each of contour segments defined by two adjacent vertices is approximated by corresponding one of line segments, each line segment joining the two adjacent vertices.

The process is initiated by detecting a maximum length line segment (MLLS) among the line segments for the contour based on the vertex information at step 401. For example, referring to FIG. 6, a line segment $V_1V_9$ is detected as a MLLS for a contour 610 since the line segment $V_1V_9$ has a largest length among the line segments for the contour 610. Then, the process goes to step 402.

At step 402, an initial vertex position information (IVPI) and a final vertex position information (FVPI) for the contour are encoded, wherein the initial vertex and the final vertex are two vertices constituting the MLLS. For example, referring to FIG. 6, two vertices $V_1$ and $V_9$ constituting the MLLS $V_1V_9$ are regarded as the initial vertex and the final vertex therefor, respectively.

Thereafter, at step 403, a first bit number (FBN) and a second bit number (SBN) for the contour are set, wherein the FBN is the number of bits required to encode the MLLS; the SBN is the number of bits calculated by using the FBN in accordance with a preset calculation rule; and the SBN is smaller than the FBN.

In accordance with the preferred embodiment of the present invention, SBN is set equal to either FBN-1 or FBN-2, preferably FBN-1. Then, the process flows to step 404.

It should be noted that the FBN is a positive integer, smallest among positive integers equal to or greater than $\log_2 X$, wherein the X is a length of the MLLS in the unit of pixels.

At step 404, each of the vertices is classified either as a first vertex or as a second vertex based on the SBN and the vertex information in accordance with a preset classification rule to thereby provide first vertices (FV's) and second vertices (SV's).

In accordance with the preferred embodiment of the present invention, each of the vertices is classified as the first vertex and the second vertex depending on the number of bits required to encode a line segment corresponding thereto being greater than and not greater than the SBN, respectively.

For example, in FIG. 6, it is assumed that SBN is FBN-1; each of lengths of line segments $V_1V_2$, $V_8V_9$ is longer than half of the length of the MLLS, i.e., $V_1V_9$; and each of lengths of line segments $V_2V_3$, $V_3V_4$, $V_4V_5$, $V_5V_6$, $V_6V_7$ and $V_7V_8$ is equal to or shorter than half of the length of the MLLS. In this case, the vertices $V_2$ and $V_9$ are classified as FV's, respectively; and the vertices $V_3$ to $V_8$ are classified as SV's, respectively.

Thereafter, at step 405, an escape signal (ECS) for each second vertex is produced to thereby supply a plurality of ECS's for the SV's. It should be noted that each of the ECS's identifies a vertex, i.e, a second vertex, corresponding to a line segment whose length is equal to or shorter than half of the length of the MLLS. Then, the process goes to step 406.

At step 406, the number of the FV's (NFV) and the number of the SV's (NSV) for the contour are calculated. Then, the process proceeds to step 407 through a tab A as shown in FIGS. 4A and 4B.

Then, in the process, through steps 407 to 410, each of the FV's and the SV's is encoded with either FBN or SBN based on the ECS's and the comparison result for NFV and NSV to thereby provide encoded FV's and encoded SV's.

In detail, at step 407, a value of (NFV/NSV) is compared with a predetermined threshold value TH and then, the process goes to step 408 if (NFV/NSV)≦TH; and the process flows to step 410 if (NFV/NSV)>TH. In accordance with the preferred embodiment of the present invention, the TH ranges from 0.8 to 1.2, typically 1.

At step 410, each of the FV's and the SV's is encoded with SBN, thereby providing the encoded FV's and the encoded SV's. Then, the process is ended.

Meanwhile, at step 408, an indication signal for the contour is generated, wherein the indication signal informs that (NFV/NSV)≦TH. Then, the process goes to step 409.

At step 409, each of the FV's and each of the SV's are encoded with FBN and SBN, respectively, thereby providing the encoded FV's and the encoded SV's. Then, the process is ended.

Figure 5:
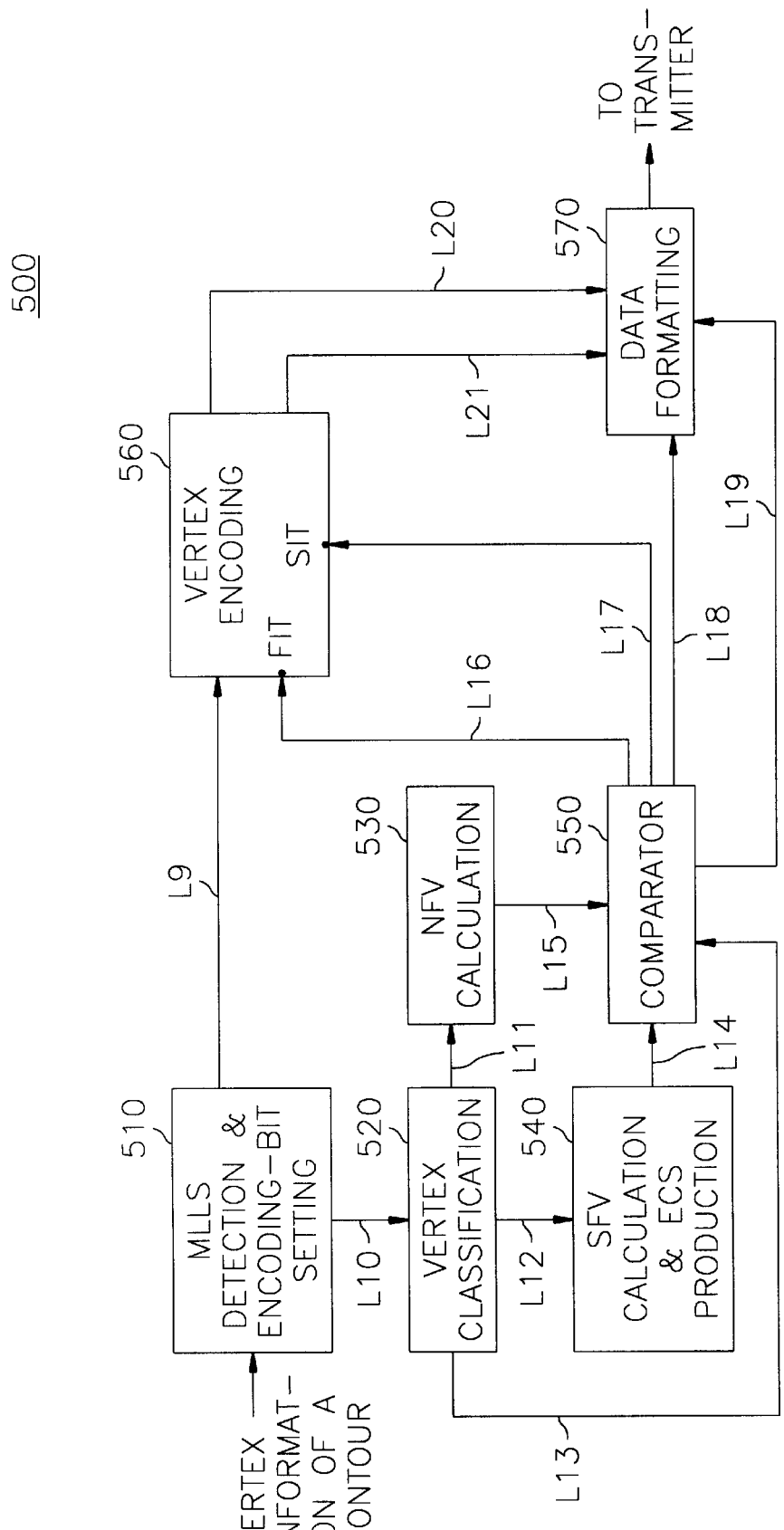
FIG. 5 sets forth a block diagram of an apparatus for encoding a contour of an object in a video signal in accordance with a preferred embodiment of the present invention.

FIG. 5 sets forth a block diagram of an apparatus 500 for encoding a contour of an object in a video signal in accordance with the preferred embodiment of the present invention employing the contour encoding method described above.

The apparatus 500 comprises a MLLS detection & encoding-bit setting circuit 510, a vertex classification circuit 520, a NFV calculation circuit 530, a SFV calculation & ECS production circuit 540, a comparator 550, a vertex coding circuit 560 and a data formatting circuit 570.

In the apparatus 500, a vertex information representing a position and an index of an octant corresponding to each vertex for a contour of an object in a video signal is inputted therein. The apparatus 500 encodes the vertex information by using an octant-based vertex coding technique. It should be noted that a plurality of vertices are determined on the contour and each of contour segments defined by two adjacent vertices is approximated by corresponding one of line segments, each line segment joining the two adjacent vertices.

The MLLS detection & encoding-bit setting circuit 510, based on the vertex information, detects a MLLS among the line segments for the contour and then sets a first bit number (FBN) and a second bit number (SBN) for the contour, wherein the FBN is the number of bits required to encode the MLLS; the SBN is the number of bits calculated by using the FBN in accordance with a preset calculation rule; and the SBN is smaller than the FBN.

In accordance with the preferred embodiment of the present invention, SBN is FBN-1. The MLLS detection & encoding-bit setting circuit 510 supplies the FBN, SBN and the vertex information to the vertex classification circuit 520 through a line L10.

At the same time, the MLLS detection & encoding-bit setting circuit 510 provides an initial vertex position information (IVPI) and a final vertex position information (FVPI) for the contour to the vertex encoding circuit 560 via a line L9, wherein the initial vertex and the final vertex are two vertices constituting the MLLS.

The vertex classification circuit 520, based on the SBN and the vertex information, classifies each of the vertices either as a first vertex or as a second vertex in accordance with a preset classification rule to thereby provide first vertices (FV's) and second vertices (SV's) to the NFV calculation circuit 530 and the SFV calculation circuit 540 through lines L11 and L12, respectively. At the same time, the vertex classification circuit 520 supplies the FV's and the SV's to the comparator 550 via a line L13.

In accordance with the preferred embodiment invention, at the vertex classification circuit 520, each of the vertices is classified as the first vertex and the second vertex depending on the number of bits required to encode a line segment corresponding thereto being greater than and not greater than the SBN, respectively.

The NFV calculation circuit 530 calculates the number of FV's (NFV) for the contour to thereby provide the NFV to the comparator 550 via a line L15. The SFV calculation & ECS production circuit 540 calculates the number of the SV's (NSV) for the contour and produces an escape signal (ECS) for each second vertex to thereby supply the NSV and a plurality of ECS's for the SV's to the comparator 550 via a line L14.

The comparator 550 compares (NFV/NSV) with a predetermined threshold value TH, thereby supplying the FV's and the SV's if (NFV/NSV)>TH to a first input terminal FIT of the vertex encoding circuit 560 via a line L16; supplying the FV's and the SV's to a second input terminal SIT of the vertex encoding circuit 560 via a line L17 if (NFV/NSV) ≦TH; feeding the ECS's to the data formatting circuit 570 via a line L18 if (NFV/NSV)≦TH; and at the same time generating an indication signal for the contour if (NFV/NSV)≦TH on a line L19. The indication signal is then fed to the data formatting circuit 570.

The vertex encoding circuit 560 encodes each of the FV's and the SV's with either the FBN or the SBN based on the ECS's and the comparison result for the NFV and the NSV generated by 550 to thereby provide encoded FV's and encoded SV's to the data formatting circuit 570 via a line L21.

In detail, the vertex encoding circuit 560 also encodes each of the FV's and the SV's with the FBN supplied to the FIT through the line L16 to thereby feed the encoded FV's and the encoded SV's to the data formatting circuit 570 via the line L21. The vertex encoding circuit 560 encodes each of the FV's and each of the SV's supplied to the SIT via the line L17 with the FBN and the SBN, respectively, thereby providing the encoded FV's and the encoded SV's, to the data formatting circuit 570 via the line L21.

Further, the vertex encoding circuit 560 encodes the IVPI and the FVPI for the contour inputted thereto via the line L9 from the MLLS detection & encoding-bit setting circuit 510, thereby feeding an encoded IVPI and an encoded FVPI to the data formatting circuit 570 via a line L20.

The data formatting circuit 570 combines the encoded IVPI, the encoded FVPI, the encoded FV's, the encoded SV's, the ECS's and the indication signal for the contour to thereby generate formatted data as an encoded contour signal.

The encoded contour signal is then transmitted to a transmitter (not shown) for the transmission thereof.

Therefore, in accordance with the present invention, there is provided a method and apparatus for encoding a contour of an object by using a vertex coding technique employing adaptive encoding-bit numbers, thereby enhancing the encoding efficiency thereof.

While the present invention has been described with respect to the particular embodiments, it will be apparent to those skilled in the art that various changes and modifications may be made without departing from the spirit and scope of the invention as defined in the following claims.

What is claimed is:

1. A method for encoding a contour of an object in a video signal based on a vertex information representing a position and an index of an octant corresponding to each vertex of the contour by using an octant-based vertex coding technique, wherein a plurality of vertices are determined on the contour and each of contour segments defined two adjacent vertices is approximated by corresponding one of line segments joining the two adjacent vertices, the method comprising the steps of:

(a) detecting a maximum length line segment (MLLS) among the line segments for the contour based on the vertex information;

(b) encoding an initial vertex position information (IVPI) and a final vertex position information (FVPI) for the contour, wherein the initial vertex and the final vertex are two vertices constituting the MLLS;

(c) setting a first bit number (FBN) and a second bit number (SBN) for the contour, wherein the FBN is the number of bits required to encode the MLLS and the SBN is the number of bits calculated by using the FBN in accordance with a preset calculation rule, the SBN being smaller than the FBN;

(d) classifying, based on the SBN and the vertex information, each of the vertices either as a first vertex or as a second vertex in accordance with a preset classification rule to thereby provide first vertices (FV's) and second vertices (SV's);

(e) producing an escape signal (ECS) for each second vertex to thereby supply a plurality of ECS's for the SV's; and (f) calculating the number of the FV's (NFV) and the number of the SV's (NSV) for the contour.

2. The method according to claim 1, further comprising the step of:

(g) encoding each of the FV's and the SV's with either the FBN or the SBN based on the ECS's and the comparison result for the NFV and the NSV to thereby provide encoded FV's and encoded SV's.

3. The method according to claim 2, wherein in said step (d), in accordance with the preset classification rule, said each of the vertices is classified as the first vertex and the second vertex depending on the number of bits required to encode a line segment corresponding thereto being greater than and not greater than the SBN, respectively.

4. The method according to claim 3, wherein said step (g) including the steps of:

(g1) comparing (NFV/NSV) with a predetermined threshold value TH and then encoding each of the FV's and the SV's with FBN if (NFV/NSV)>TH, thereby providing the encoded FV's and the encoded SV's;

(g2) generating an indication signal for the contour if (NFV/NSV)≦TH; and (g3) in case that the indication signal is generated at said step (g2), encoding each of the FV's and each of the SV's with FBN and SBN, respectively, thereby providing the encoded FV's and the encoded SV's.

5. The method according to claim 4, wherein the FBN is a positive integer, smallest among positive integers equal to or greater than $\log_2 X$, wherein the X is a length of the MLLS in the unit of pixels.

6. The method according to claim 4, wherein in accordance with the preset calculation rule, SBN is FBN-1.

7. The method according to claim 4, wherein the TH ranges from 0.8 to 1.2.

8. The method according to claim 7, wherein the TH is 1.

9. An apparatus for encoding a contour of an object in a video signal based on a vertex information representing a position and an index of an octant corresponding to each vertex of the contour by using an octant-based vertex coding technique, wherein a plurality of vertices are determined on the contour and each of contour segments defined by two adjacent vertices is approximated by corresponding one of line segments joining the two adjacent vertices, the apparatus comprising:

means, based on the vertex information, for detecting a maximum length line segment (MLLS) among the line segments for the contour and then setting a first bit number (FBN) and a second bit number (SBN) for the contour and at the same time providing an initial vertex position information (IVPI) and a final vertex position information (FVPI), wherein the initial vertex and the final vertex are two vertices constituting the MLLS, respectively; the FBN is the number of bits required to encode the MLLS; the SBN is the number of bits calculated by using the FBN in accordance with a preset calculation rule; and the SBN is smaller than the FBN;

means, based on the SBN and the vertex information, for classifying each of the vertices either as a first vertex or as a second vertex in accordance with a preset classification rule to thereby provide first vertices (FV's) and second vertices (SV's);

means for calculating the number of FV's (NFV) for the contour;

means for calculating the number of the SV's (NSV) for the contour and producing an escape signal (ECS) for each second vertex to thereby supply the NSV and a plurality of ECS's for the SV's; and means for comparing (NFV/NSV) with a predetermined threshold value TH, thereby supplying the FV's and the SV's if (NFV/NSV)>TH; and supplying the FV's, the SV's and the ECS's and at the same time generating an indication signal for the contour if (NFV/NSV)≦TH.

10. The apparatus according to claim 9, further comprising:

means for encoding each of the FV's and the SV's with either the FBN or the SBN based on the ECS's and the comparison result for the NFV and the NSV to thereby feed encoded FV's and encoded SV's.

11. The apparatus according to claim 10, wherein said encoding means encodes the IVPI and the FVPI for the contour to thereby feed an encoded IVPI and an encoded FVPI; encodes said each of the FV's and the SV's with the FBN to thereby feed the encoded FV's and the encoded SV's in case that the FV's and the SV's are supplied to a first input terminal thereof; and, in case that the FV's and the SV's are supplied to a second input terminal thereof, encodes said each of the FV's with FBN and said each of the SV's with the SBN, respectively, thereby feeding the encoded FV's and the encoded SV's.

12. The apparatus according to claim 11, further comprising:

means for combining the encoded IVPI, the encoded FVPI, the encoded FV's, the encoded SV's and the indication signal for the contour to thereby generate formatted data as an encoded contour signal.

13. The apparatus according to claim 9, wherein in accordance with the preset classification rule, said each of the vertices is classified as the first vertex and the second vertex depending on the number of bits required to encode a line segment corresponding thereto being greater than and not greater than the SBN, respectively.

14. The apparatus according to claim 9, wherein in accordance with the preset calculation rule, SBN is FBN-1.

15. The apparatus according to claim 9, wherein the FBN is a positive integer, smallest among positive integers equal to or greater than $\log_2 X$, wherein the X is a length of the MLLS in the unit of pixels.

16. The apparatus according to claim 9, wherein the TH ranges from 0.8 to 1.2.

* * * * *